United States Patent [19]
Brown

[11] Patent Number: 5,097,604
[45] Date of Patent: Mar. 24, 1992

[54] GAUGE POSITIONER

[76] Inventor: Kevin E. Brown, 1450 - 43rd St., SW., Wyoming, Mich. 49509

[21] Appl. No.: 683,867

[22] Filed: Apr. 11, 1991

[51] Int. Cl.$^5$ .............................................. B23Q 17/22
[52] U.S. Cl. ........................................ 33/613; 33/626; 33/832; 33/833
[58] Field of Search ................ 33/613, 644, 645, 626, 33/636, 638, 639, 641, 783, 832, 833; 269/292, 291, 295

[56] References Cited

U.S. PATENT DOCUMENTS

| | | | |
|---|---|---|---|
| 1,887,437 | 11/1932 | Schotthoefer | 33/833 |
| 2,759,269 | 8/1956 | Haase et al. | 33/832 |
| 2,878,575 | 3/1959 | Ganson | 33/626 |
| 3,106,023 | 10/1963 | Wilson | 33/636 |
| 4,420,890 | 12/1983 | Naylor | 33/613 |
| 4,623,286 | 11/1986 | Hitt | 33/628 |
| 4,945,651 | 8/1990 | Georg | 33/626 |

OTHER PUBLICATIONS

Sketch of prior art (date unknown).

*Primary Examiner*—William A. Cuchlinski, Jr.
*Assistant Examiner*—C. W. Fulton
*Attorney, Agent, or Firm*—Warner, Norcross & Judd

[57] ABSTRACT

A gauge positioner used for measuring the edge portion of the surface of a workpiece held on a measuring fixture is disclosed. The positioner has a lip which rests upon the corner of the measuring fixture under the workpiece edge. The upper portion of the positioner overhangs, and is spaced above, the lip. A hole is formed through the upper portion of the positioner for receiving the barrel of a measuring gauge and positioning the tip of the gauge in measuring contact with the workpiece.

11 Claims, 1 Drawing Sheet

GAUGE POSITIONER

BACKGROUND OF THE INVENTION

1. Field of the Invention

The present invention relates to measuring, and, more particularly, to a device for positioning a gauge relative to a workpiece to be measured.

2. Description of the Related Art

Quality control techniques are commonly used to determine the dimensional accuracy and consistency of mass produced parts. One such technique involves placing a part or workpiece in a predetermined position on a measuring jig or fixture, placing a gauge in contact with the workpiece while holding the gauge in a predetermined position with respect to the fixture, and obtaining a reading from the gauge. This technique might be used to measure flatness, curvature, thickness, depth, height, or other dimensions or qualities.

It may frequently be desired to measure the dimensions along the edge of a plate or sheet workpiece. In the past, such measurements have been carried out by placing the workpiece on a fixture with spacers which space the edge of the workpiece a small distance away from the edge of the fixture and by inserting a tapered or stepped feeler gauge into the gap between the workpiece and the fixture.

In the case of a tapered feeler gauge, the gauge is inserted until the gauge is in contact with both the fixture and the workpiece. The height of the gap is determined from gradations marked on the gauge, and from this reading the corresponding dimension of the workpiece is calculated. The accuracy and repeatability of this technique depends largely on the force with which the tapered feeler gauge is inserted. Therefore, this technique is quite inaccurate when performed manually, as it usually is.

In the case of a stepped feeler gauge, the gauge is in the form of a rectangular plate having protruding or notched corners of known dimensions. The protrusions or notches are aligned with the gap between the fixture and the workpiece. A shim-type feeler gauge is used to fill in any remaining space between the stepped gauge and the workpiece. The readings on both gauges are summed to arrive at the desired measurement. The use of two gauges is cumbersome and prone to arithmetic errors. The accuracy is limited by size of the notches or steps.

Another approach to workpiece edge measurements has been the use of permanent or semi-permanent gauge holders attached to the fixture or a nearby structure. With this approach, the gauge holder includes a base, a swing arm pivotably mounted to the base, and a gauge positioner mounted at the end of the swing arm. In use, the workpiece is placed on the fixture with the swing arm pivoted out of the way. The mounting of the swing arm to the base is such that the arm may be swung into a predetermined position with respect to the fixture. A measuring gauge such as a spring-loaded retractable probe is placed in the positioner and brought into contact with the workpiece. A gauge reading is taken and the workpiece dimension determined. Measurements taken in this manner may be more precise and accurate; however, the gauge holders are complicated, expensive, and subject to wear and damage which impairs their reliability.

Therefore, there is a heretofore unmet need for a gauge positioner for use in measuring along the edge of a workpiece which is simply and economically constructed and which is capable of providing accurate, precise, and repeatable measurements.

SUMMARY OF THE INVENTION

The present invention satisfies the aforementioned need by providing a compact, hand held gauge positioner having a lip used to locate the positioner on the measuring fixture and a hole for receiving the barrel of a probe type gauge. When the gauge barrel is inserted into the positioner hole, the gauge probe is automatically positioned in contact with the workpiece in a predetermined location with respect to the lip and, therefore, with respect to the fixture and the workpiece.

According to a preferred embodiment of the invention, the gauge positioner is formed as a rigid, dimensionally stable body having a lower portion with a forward surface, a lip extending forwardly from the upper extent of the lower portion, a central body portion forming a rearwardly extending recess above the lip, and an upper body portion extending above and forwardly overhanging the lip. The upper body portion is formed with a hole therethrough directed toward the recess having an axis generally parallel to the forward surface of the lower portion of the body and dimensioned to slidingly receive the barrel of a spring loaded probe gauge.

In use, the workpiece is placed in predetermined position upon a measuring fixture. The edge portion of the workpiece lies adjacent the edge of the measuring fixture spaced apart from a corner edge of the measuring fixture by a small distance sufficient to provide clearance for the lip of the gauge positioner. The gauge positioner is manually located with the underside of the lip resting upon the fixture corner edge under the workpiece edge at the point at which the workpiece is to be measured. The positioner is pressed against the measuring fixture so that the forward face of the lower portion of the positioner contacts the side or edge of the measuring fixture. The barrel of the measuring gauge is inserted through the hole in the upper portion of the positioner until further insertion is limited by contact between a shoulder on the gauge barrel and the upper surface of the positioner. In this position, the spring loaded probe is in measuring contact with the workpiece and partially retracted into the barrel. A gauge reading is then taken which corresponds to the distance the probe is retracted. This reading may be used to determine a corresponding workpiece measurement. In this manner, the gauge is held by the positioner in a predetermined position with respect to the measuring fixture.

The positioner is readily, manually relocated at various points along the edge of the workpiece. There are no moving parts susceptible to wear or damage. The positioning of the positioner is repeatable and does not require a high degree of operator skill or care in order to provide an accurate and repeatable measurement.

The positioner may be economically formed of a unitary metal body, or as an assembly of parts permanently and rigidly fixed together.

These and other objects, advantages, and features of the present invention will be more fully understood and appreciated by reference to the written specification and appended drawings.

DESCRIPTION OF THE PREFERRED EMBODIMENT

Figures 1, 2, 3:
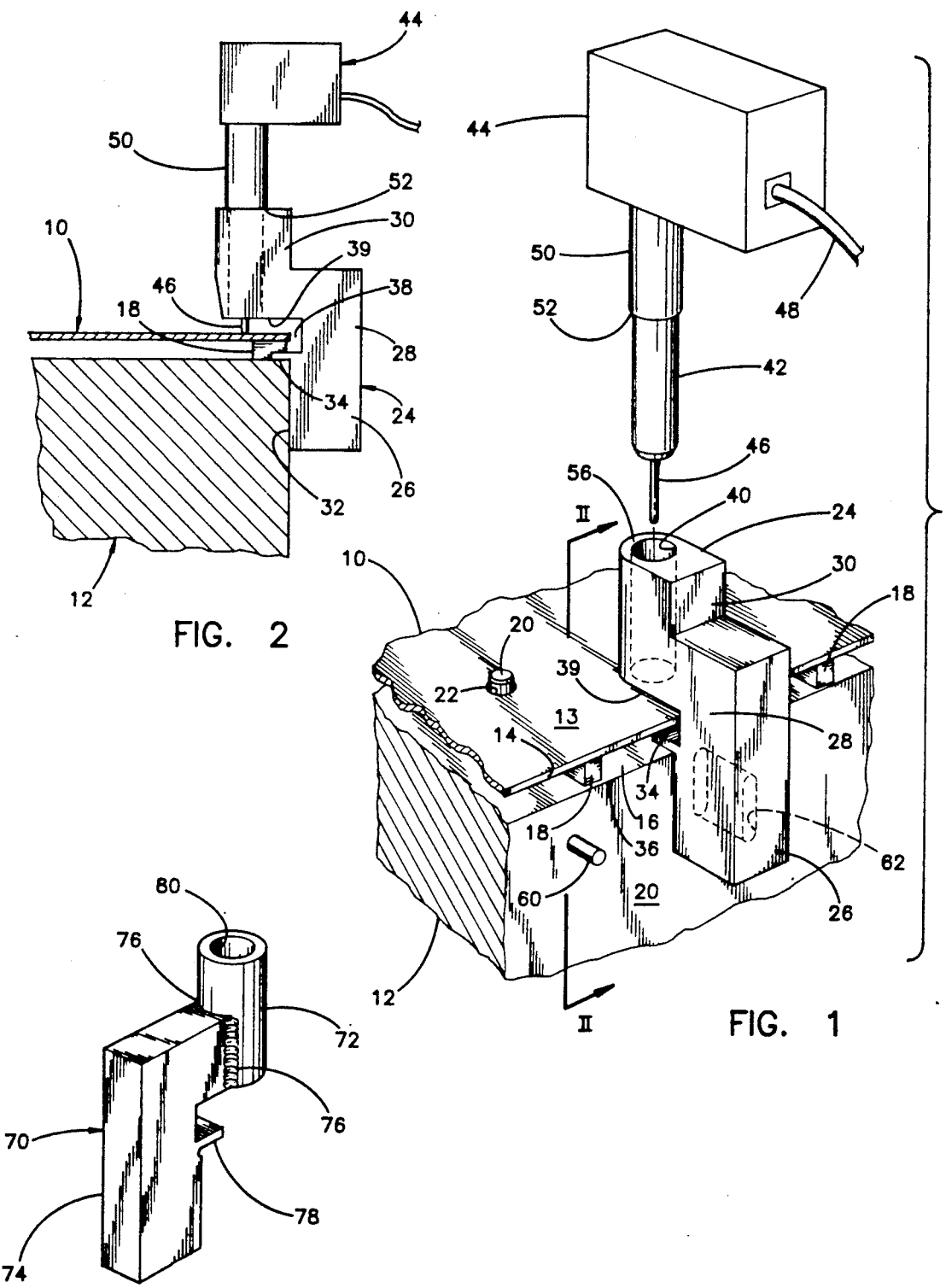
FIG. 1 is a perspective view of a gauge positioner according to the invention shown in position for the measurement of a workpiece on a measuring fixture and with a measuring gauge in position for insertion into the gauge positioner.
FIG. 2 is a side sectional view taken substantially along the line 2—2 of FIG. 1 but with the measuring gauge inserted into the gauge positioner.
FIG. 3 is a perspective view of an alternate embodiment of the gauge positioner according to the invention.

By way of disclosing a preferred embodiment, and not by way of limitation, there is shown in FIGS. 1 and 2 a workpiece 10 placed atop the upper surface of a measuring table or fixture 12 in readiness for taking measurements on the upper surface 13 of the workpiece along the edge 14 of the workpiece. The workpiece is shown as a generally planar plate or sheet. Typically, workpiece 10 is a fabricated part for use, for example, as a vehicle body panel or interior panel. However, the invention is suitable for use for any type of workpiece that may be held in a predetermined position on a measuring fixture.

The measuring fixture 12 is a rigid, stable block or table. The upper surface 16 of the measuring fixture is generally of the same shape as the workpiece 10. Spacers 18 are fixed to the upper surface of the measuring fixture and serve to space the workpiece 10 above the measuring fixture a small distance. The measuring fixture has a forward edge or side 20 which is disposed in a plane which extends upward through or near the edge 14 of the workpiece.

To properly position the workpiece in the desired predetermined position and orientation on the measuring fixture, the measuring fixture is provided with two or more pegs such as peg 21 which pass upward through holes such as hole 22 formed through the workpiece. These workpiece holes may be provided specially for the purpose of engaging the measuring fixture pegs, or may be provided as necessary for the end use of the workpiece. Preferably, the workpiece will also be clamped down onto the measuring fixture in a known manner. The workpiece is supported such that its edge 14 is spaced apart from and approximately parallel to the corner edge 36 of the measuring fixture.

The gauge positioner 24 is shown in position for measuring the edge portion of the surface 13 of the workpiece 10. The positioner 24 is conveniently sized for manual use and is merely placed in contact against the measuring fixture 12. Preferably, there is no mechanical interconnection between the positioner and the measuring fixture or the workpiece so that the positioner may be readily positioned and repositioned at various measuring points along the workpiece edge.

The positioner 24 in its general organization includes a body having a lower portion 26, a central portion 28, and an upper portion 30. The lower portion has a planar forward surface 32 which is placed in overlying contact with the side 20 of the measuring fixture. Between the upper extent of the lower portion 26 and the lower extent of the central portion 28 a lip 34 protrudes forwardly. The underside of the lip 34 rests atop the upper surface 16 of the measuring fixture. Thus the underside of the lip 34 and the forward surface 32 of the lower body portion form an inside right angled corner which engages the outside corner 36 of the measuring fixture.

The central portion 28 of the positioner is formed with a recess 38 which provides clearance for receiving the edge 14 of the workpiece. Thus, a vertical gap is formed between the lip 34 and the underside 39 of the upper portion of the positioner. The upper body portion 30 overhangs the recess 38 and the lip 34.

A cylindrical hole 40 is formed through the forward extent of the positioner upper portion 30. The axis of the hole 40 is generally parallel to the plane of the forward surface 32 of the lower portion of the positioner and is directed generally toward the lip 34 and recess 38 and toward the point of the workpiece surface to be measured. The diameter of the hole 40 is slightly larger than the diameter of the barrel 42 of the measuring gauge 44 to be used such that the barrel 42 may freely slide into the hole 40 but without excessive looseness or play. The lengths of the barrel 42 and of the hole 40 are approximately equal.

The measuring gauge 44 is shown as an electronic instrument having a spring loaded retractable probe tip 46. The gauge transmits a signal through wire 48 which provides a reading of the distance at which the probe 46 is retracted into the barrel 42. As will be appreciated by those skilled in the art, other types of gauges such as dial gauges may be employed with the positioner of the invention.

The end of the gauge 44 opposite the probe tip 46 extends from a shank 50. The diameter of the shank is somewhat larger than the diameter of the barrel 42 so as form a shoulder 52. The upper surface 56 of the upper portion of the positioner surrounding the hole 40 provides an abutment surface which engages the shoulder 52 of the gauge when the gauge barrel is fully inserted into the hole. Thus, the shoulder 52, barrel 42, hole 40 and abutment upper surface 56 cooperate to determine the location and orientation of the gauge probe tip 46 with respect to the positioner and, therefore, with respect to the measuring fixture 12 and workpiece 10.

As best shown in FIG. 2, the positioner 24 is preferably dimensioned and configured so that the probe tip 46 will be retracted to approximately the middle of its range of retraction movement when the gauge is fully inserted in the positioner and the tip is in measuring contact with the workpiece.

Those skilled in the art will appreciate that, in order to obtain an absolute value for the workpiece measurement being sought, it will usually be necessary to take a zero reading in which there is no workpiece on the fixture 12 and in which the probe tip is extended to the plane of the underside of the lip 34. Also, an offset should be determined corresponding to the difference between the zero reading and the level of the upper surface 13 of an ideal workpiece. Advantageously, these zero and offset values may be entered into a suitably programmed computer. Furthermore, the gauge 44 may be connected by wire 48 to the computer for automatic computation of the value of the desired measurement or the deviation of the measurement from an ideal value.

Referring to FIG. 1, it may be seen that the fixture 12 may be provided with one or more locating pins such as pin 60 protruding from the side 20 of the fixture. The pins are disposed at the desired workpiece measuring points. The positioner 24 may be provided with a cylindrical or slotted hole or recess 62 which receives the pin 60. In this manner, the positioner may be located at predetermined locations along the workpiece edge.

These locations will then be readily repeatable from workpiece to workpiece.

The positioner shown in FIGS. 1 and 2 is made of a unitary block of material, preferably steel for rigidity, dimensional stability, and durability. The positioner may also be made as an assembly of two or more parts permanently affixed together. An alternate embodiment of the positioner 70 is shown in FIG. 3 which is an assembly of a cylindrical element 72 and a block element 74 permanently affixed together by weldments 76. The block element provides a lip 78 for engaging the corner of a measuring fixture and the cylindrical element provides a hole 80 for receiving the gauge barrel in the same manner described above. Numerous other configurations are possible within the scope of the invention.

As used in this specification and the appended claims, terms such as "forward", "upper", "lower" and "vertical" are used to describe the orientations of the various structural features of the invention relative to one another. It is within the scope of the invention that the positioner may be used in orientations other than the vertical orientation shown in the drawing. Such terms are intended to include all possible orientations.

The above description is that of a preferred embodiment of the invention. Various alterations and changes can be made without departing from the spirit and broader aspects of the invention as set forth in the appended claims, which are to be interpreted in accordance with the principles of patent law, including the Doctrine of Equivalents.

The embodiments of the invention in which an exclusive property or privilege is claimed are defined as follows:

1. A gauge positioner comprising a body having a lower surface, a lip protruding from the upper extent of said lower surface, an upper body portion overhanging and spaced apart from said lip, and a hole formed through said upper body portion adapted to receive the barrel of a measuring gauge, said lip and said lower surface adapted to engage a corner of a measuring fixture thereby to position a measuring gauge received in said hole in a predetermined position with respect to the measuring fixture.

2. The gauge positioner of claim 1 wherein said gauge positioner is readily manually positioned in contact with said measuring fixture.

3. The gauge positioner of claim 1 wherein said body comprises a unitary element.

4. The gauge positioner of claim 1 wherein said body comprises an assembly of a plurality of elements rigidly affixed together.

5. The gauge positioner of claim 1 wherein said upper body portion has a surface forming an abutment for engagement with a shoulder on the measuring gauge to limit the extent of insertion of the measuring gauge into said hole.

6. A manual gauge positioner for use in measuring a workpiece adjacent a workpiece edge with the workpiece held in a predetermined position on a measuring fixture, the workpiece being supported spaced apart from the upper surface of the measuring fixture with the workpiece edge extending along a corner of the measuring fixture, said gauge positioner comprising a body having a lower portion, a central portion, and an upper portion, said lower portion having a substantially planar forward surface, a lip protruding forwardly from the upper extent of said lower portion, said lip and said forward surface cooperating to engage the measuring fixture corner with said lip in contact with the upper surface of the measuring fixture, said body central portion extending upwardly from said lip, said body upper portion extending upwardly from said central body portion and overhanging said lip with said central body portion forming a gap between said upper body portion and said lip, said upper body portion having a hole formed therethrough having an axis directed toward said lip, said hole being dimensioned to receive the barrel of a measuring gauge and to position the probe tip in measuring contact with the workpiece and to position the measuring gauge in a predetermined relationship with respect to the measuring fixture.

7. The gauge positioner of claim 6 wherein said body upper portion includes an upper surface forming an abutment adapted to engage a shoulder on the measuring gauge barrel and to limit the extent of insertion of the barrel into said hole.

8. The gauge positioner of claim 6 wherein said body comprises a unitary element.

9. The gauge positioner of claim 6 wherein said body comprises a plurality of elements permanently and rigidly affixed together.

10. The gauge positioner of claim 6 wherein said body is configured and dimensioned such that the measuring gauge is in approximately the middle of its range of measurement when received in said body and in measuring contact with the workpiece.

11. A gauge positioner for positioning a gauge in measuring contact with a surface of a workpiece adjacent an edge of the workpiece, said workpiece edge supported on a measuring fixture spaced apart from a corner edge of the measuring fixture and approximately parallel thereto, said gauge positioner comprising a body having a lip means for engaging the corner edge of the measuring fixture thereby locating the gauge positioner in a predetermined orientation with respect to the measuring fixture, a portion of said body disposed spaced apart from and overhanging said lip and having a hole formed therethrough with its axis directed toward said lip, recess means between said lip and said hole for receiving the workpiece edge, said hole adapted to receive a barrel of the gauge and position the gauge in a predetermined orientation with respect to the measuring fixture and the workpiece.

* * * * *